K. P. McELROY.
PROCESS OF OXIDIZING HYDROCARBONS.
APPLICATION FILED JAN. 10, 1918. RENEWED NOV. 2, 1918.
1,308,796.
Patented July 8, 1919.
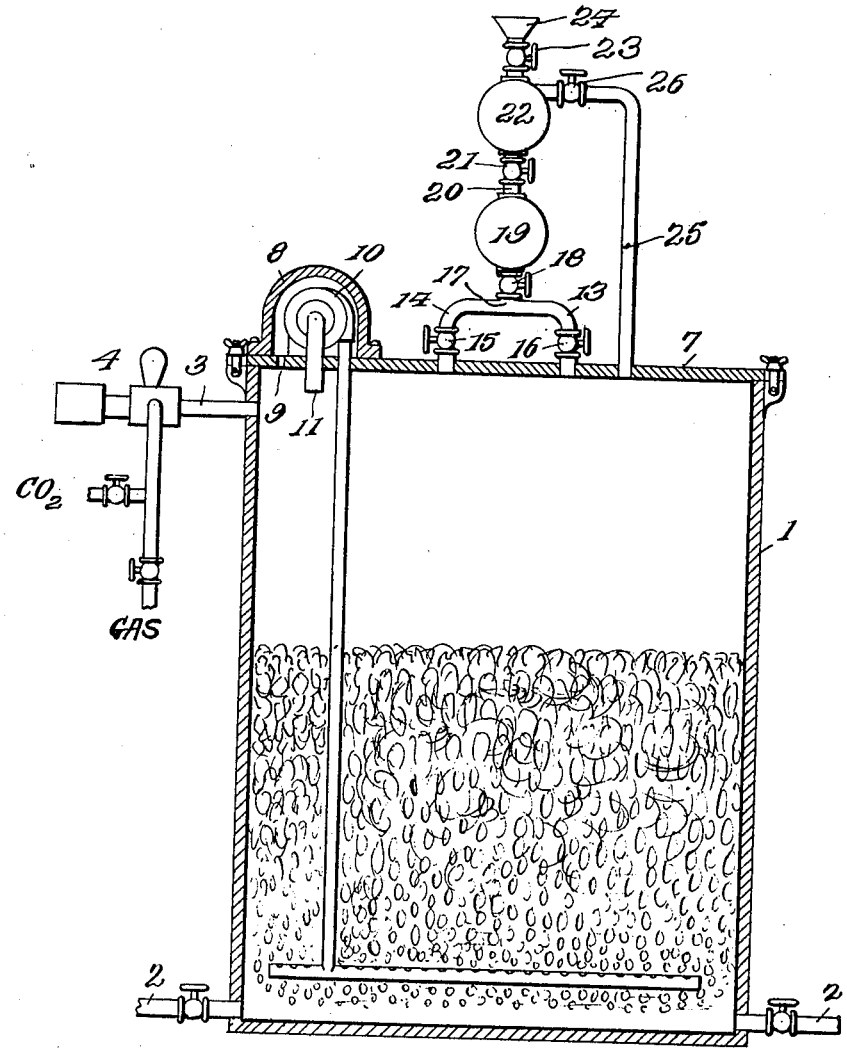

UNITED STATES PATENT OFFICE.

KARL P. McELROY, OF WASHINGTON, DISTRICT OF COLUMBIA, ASSIGNOR TO CHEMICAL DEVELOPMENT COMPANY, OF AUGUSTA, MAINE, A CORPORATION OF MAINE.

PROCESS OF OXIDIZING HYDROCARBONS.

1,308,796.  Specification of Letters Patent.  Patented July 8, 1919.

Original application filed August 2, 1912, Serial No. 712,975. Renewed March 18, 1916, Serial No. 85,200. (Patent No. 1,253,617, dated January 15, 1918.) Divided and this application filed January 10, 1918, Serial No. 211,166. Renewed November 2, 1918. Serial No. 260,916.

*To all whom it may concern:*

Be it known that I, KARL P. McELROY, a citizen of the United States, residing at Washington, District of Columbia, have invented certain new and useful Improvements in Processes of Oxidizing Hydrocarbons, of which the following is a specification.

This invention relates to processes of oxidizing hydrocarbons; and more particularly to a process of making chlorhydrin and it comprises a method of producing useful products from ethylene and other gaseous and highly reactive unsaturated hydrocarbons wherein such a hydrocarbon is submitted to a direct limited oxidation in solution, the progress of the reaction being so controlled as to limit the extent of the oxidation to the production of simple oxygen containing derivatives of such hydrocarbons and to preserve unattacked hydrocarbon in the sphere of reaction during the course of such reaction; all as more fully hereinafter described and as claimed.

There are various oxygen-containing or oxidized derivatives of ethylene, such as glycol, the chlorhydrin, glycol esters, glycol ethers, ethylene oxid, etc., having properties which would render them useful in various arts if such derivatives could be produced by a method sufficiently simple, cheap and ready to make them commercially available. At present however these bodies are not available for technical purposes being merely laboratory curiosities, made when wanted for scientific purposes by indirect, cumbrous and wasteful methods. Ordinarily, ethylene, made from alcohol, is converted into a dihalid and this is then saponified or esterified to replace the halogen by other groups. Saponification and esterification are both operations attended with some difficulty and giving small yields since the dihalids are stable, little reactive substances. Glycol, for example, is usually made for scientific purposes by converting ethylene, produced from alcohol, into the dibromid, converting the dibromid into an acetic ester and finally saponifying the latter by alkali.

It is the object of the present invention to obtain these potentially valuable oxidized bodies from ethylene and other olefinic gases by a direct limited oxidation under controlled conditions. Ethylene which is typical of the other olefinic gases is a readily oxidizable substance but being endothermically constituted, oxidation is attended with the liberation of much energy and is apt to be too far going, while the direct products of its limited oxidation, ethylene oxid, glycol and chlorhydrin are themselves also readily oxidizable. Ethylene oxid, which is the first product of oxidation, is particularly sensitive; glycol is more resistive.

I have found however that under suitable conditions the oxidation of ethylene can be limited and regulated to the desired degree and that such a limited oxidation of the ethylene itself is, so to speak, preferential over the further oxidation of these proximate oxidation products; that is so long as unattacked ethylene remains in the sphere of reaction the oxidation merely goes to the first stage and the ethylene exercises a protective action shielding the proximate products from further attack. In the present invention therefore conditions are so controlled as to restrain the violence of reaction, the heat of reaction being absorbed or removed as fast as evolved so as to maintain a predetermined temperature range; and an excess of ethylene is maintained in the sphere of reaction throughout the course of such reaction. While other methods of temperature control may be, and usefully are, employed dilution of the reacting bodies is desirable as this also aids in controlling the progress of the reaction. As stated, ethylene is endothermic and tends to enter into reaction with accelerating velocity; and dilution is useful in damping down the violence of the action.

Dilution is useful in the limited oxidation of ethylene in the gaseous state by chlorin and steam, steam being best present in ample amount, and by oxygen in the presence or absence of catalytics, such as platinum black, labile oxids, nitrous vapors, etc.; and in the treatment of ethylene dissolved in various liquids; advantageously an aqueous liquid. The solubility of ethylene in most aqueous liquids is relatively small so that even a saturated solution thereof is still actually, as regards the ethylene, very dilute; and the heat of oxidation becomes a limited quantity readily taken up and controlled by the liquid solvent. In fact the solubility of ethylene as ethylene in most aqueous liquids is so small as compared with that of many of the ordinary oxidants that in oxidizing in aqueous solutions special means must ordinarily be adopted to maintain the ethylene solution replenished with the gas and prevent the chance of an excess of such oxidant existing at any time during the reaction.

Several expedients to this end may be employed. One is an increase in pressure which causes a concomitant increase in the solubility of ethylene. With 15 pounds gage pressure, the amount which can be held in solution and drawn upon for reaction is about doubled. Another is quicker replenishment of the supply of dissolved ethylene by filming the liquid or otherwise increasing the area of contact between liquid and gas. Vigorous agitation of the liquid to prevent localized changes in the relative concentration of ethylene and oxidant is desirable. The increase in area of contact and the agitation may be simultaneously attained and a number of other desirable results secured by causing a cycle circulation of the gas to, through and back to the reaction liquid; that is with a reaction chamber having a gas feed and means for withdrawal of waste gas there may be provided additional means capable of continuously taking gas from above the body of liquid and again bubbling it therethrough. Advantageously there may be employed a fan or blower. The fan means may be, and advantageously is, speeded up so as to maintain an emulsion of liquid and gas.

Another expedient often useful is to maintain porous, adsorptive materials, such as charcoal, coke, boneblack, platinum black, etc., suspended in the liquid to absorb gas and re-deliver it to the liquid in which the oxidant is contained or in which it is being developed. Such bodies may, and usually do, superadd a useful catalytic effect in aiding oxidation.

Still another expedient is to maintain in contact with an aqueous reaction liquid or bath an oily liquid having a greater solvent power for ethylene to act, so to speak, as a store of ethylene. Oil of turpentine, for example, dissolves about $2\frac{1}{2}$ times its volume of ethylene so that a drop of the oil saturated with the gas holds $2\frac{1}{2}$ times as much ethylene as a bubble of the gas itself of the same size as such a drop. The use of an oily carrier of this kind is particularly advantageous with gases poor in ethylene, since it takes up ethylene and other unsaturated hydrocarbon gases with greater readiness than it does many other gases.

It is commonly useful to employ several of these expedients simultaneously as in feeding ethylene to an oxidizing chamber maintained under pressure as high as convenient, provided with means for cyclic gas circulation and containing in addition to the aqueous oxidizing bath an immiscible oily gas absorbent. However such expedients may be separately used.

The ethylene used in the present invention may be produced from any of the usual sources, as by dehydrating alcohol, by hydrogenating acetylene or by destructive distillation or cracking of coal, oil or other carbonaceous bodies. Using ordinary coal gas as a source of ethylene, it is useful to extract ethylene and other olefinic gases by means of wash oil; though the other oily carriers described may also be used. From the wash oil, the olefinic gases may be separated in a concentrated state by heating or vacuum. By proper precaution petroleum oil may be cracked down to form gas mixtures rich in ethylene, propylene and the butylenes; and useful in the present invention. Acetylene may be hydrogenated to ethylene by catalytics or electrolytically.

Many oxidants may be useful in the present invention such as oxidizing salts, like permanganates, chromates, vanadates, arsenates, etc., in acid, alkaline or neutral baths. Peroxidized bodies, such as hydrogen peroxid, barium peroxid, calcium peroxid, sodium peroxid, perborates, persulfates, etc., may also be used. Manganese binoxid and an acid may be employed. Bleaching powder containing a trace of cobalt or other catalytic causing an evolution of nascent oxygen may be used. When ethylene chlorhydrin is desired, bleaching powder may be acidulated with a weak acid. Or chlorin may be led into or formed in an aqueous solution of ethylene which may also contain neutralizing bodies, such as magnesia, chalk, soda, etc., to neutralize the HCl formed.

With many of these oxidants, the addition of the same or the development of its oxidizing influence should be proportionate to the rate of solution of ethylene; there should always be unattacked ethylene in the sphere of reaction.

In the accompanying illustration I have shown, more or less diagrammatically, a generalized type of apparatus which may be used in many of the reactions described herein. In this showing Reference character 1 indicates a vessel which may be of any suitable material, such as sheet steel, appropriately coated with a resistant inner lining. This is advantageously built so as to withstand internal pressure. It is provided with valved draw-off outlets 2 for removing liquid. It is also provided with inlet 3, supplied by pressure pump 4, through which an olefinic gas, or mixtures of such gas with any other gas desired, may be supplied under any convenient pressure. The vessel is provided with cover 7 which may be clamped on in any suitable manner. This cover carries hood 8 having communication with the chamber of the vessel through orifice 9. This equalizes the chamber pressure with that of the hood 8. Within this hood is mounted any simple type of blower or pump, shown here as rotary fan 10. This blower has communication with the gas space within the chamber at 11 and is provided with conduit 12 extending nearly to the bottom of the vessel. The lid may also be provided with two conduits 13 and 14 placed on each side of the center and valved respectively at 15 and 16. These two conduits unite as conduit 17, valved at 18, which expands into chamber 19. Above this chamber is a length of tubing 20, valved at 21, and connecting with another chamber 22, above which is valve 23 and hopper or funnel 24. Equalizing pipe 25, valved at 26, allows equalization of pressure. This last described device enables equalization of gas pressure with that of the chamber by opening appropriate valves; and it also allows liquid to be fed to either side of the central plane of the chamber and without disturbance of the chamber pressure. For example, a liquid may be fed into 24, and, valves 26 and 21 being closed, may be fed into 22 by opening valve 23. By now closing valve 23 and opening 26 and 21, (valve 18 being normally open) the liquid may be caused to pass down into 19 and thence by 16 or 15, the liquid may be discharged on either side of the central plane of the chamber.

Ethylene, or gas containing ethylene, may be introduced into the apparatus by means of pump 4 at any pressure desired, say, 4 or 5 atmospheres. Upon now starting blower 10 into operation, the liquid may be kept thoroughly saturated with dissolved ethylene. It is advantageous to run this pump or blower at such a rate that the liquid is maintained as more or less of an emulsion of gas and liquid; as a foamy mass. The rate of development of the oxygen should be limited according to the rate of solution of ethylene so that an excess of ethylene shall remain in the solution at all times. Should the solution temporarily become exhausted of ethylene, there would be danger of the oxidation of glycol to form glycolic acid, etc. The apparatus may be run discontinuously, a charge of ethylene, or gas containing the same, as for example, a pyrolytic oil gas containing say 40 to 50 per cent. of ethylene and other olefins, introduced and the pump 10 kept in operation until the olefins of the charge has become absorbed and oxidized. The waste gas may be vented through 14. Another charge of ethylene, or gas containing the same, may now be introduced and so on until the concentration of glycol in the solution becomes as high as may be desired.

Apparatus of the type described and shown may also be used for the production of chlorhydrins under the present invention. An oxidizing liquid may be fed in at a regulated rate through funnel 24 and connected parts. This oxidizing liquid may be a milk of bleaching powder. The rate of feed should be such as not to exceed the rate of solution of ethylene in the fluid of the chamber. Potassium permanganate solution may be fed in in the same manner. Many other oxidizing fluids may be similarly used. Or a charge of bleaching powder and water may be fed in through 24 and connected parts and then a mixture of carbon dioxid and ethylene fed in by pump 4. The carbon dioxid will decompose the bleaching powder forming hypochlorous acid which will unite with the ethylene to form chlorhydrin. Or the apparatus may be charged with bleaching powder and water containing a very small proportion of a cobalt salt and ethylene fed in and circulated as before. In the presence of a cobalt salt as a catalyst, bleaching powder gives up oxygen at a slow rate; and this oxygen will oxidize the ethylene. The rate may be controlled by controlling the amount of cobalt salt present and should be such that the rate of development of oxygen will not exceed the rate of solution of ethylene.

Gaseous acetylenic hydrocarbons, such as acetylene, and gaseous diolefinic hydrocarbons, as well as gaseous olefins, may be advantageously oxidized by the present process.

In using weak ethylenic gases, such as those from cracking oil, from acetylene hydrogenated by nickel in the presence of a diluent, gas etc., the desired products may be obtained cheaply. By operating a number of chambers in series, as regards the gas feeds, each such chamber venting into the next in series, considerable advantage is obtained, each chamber then operating with gases of a constant average content; the first, say with gas averaging 40 per cent., the next with gas averaging 30 per cent. and so on.

Gas of any desired degree of purity may however be obtained from lean ethylenic gas by scrubbing the latter by a countercurrent of spirits of turpentine, heavy oil or any other solvent for ethylene, exhausting the charged solvent by vacuum or heat, or both, and returning the exhausted solvent for fresh use with the gas to be scrubbed. The rich ethylene obtained by exhausting the charged oil may then be oxidized.

The present application constitutes a division of my application filed August 2, 1912, Serial No. 712,975, renewed March 18, 1916, Serial No. 85,200.

It is to be understood that my invention is not limited to the specific processes herein described since many modifications thereof may be made without departing from the spirit of the invention.

What I claim is:

1. The process of making chlorhydrins from the gaseous olefins which consists in reacting upon such olefins with hypochlorous acid while maintaining the supply of said acid in the zone of reactions during said reaction.

2. The process of making chlorhydrins, which consists in treating an aqueous solution capable of delivering free hypochlorous acid, with an olefin in gaseous state.

3. The process of making chlorhydrins which consists in contacting an aqueous solution capable of evolving hypochlorous acid, with an olefin in the presence of a weak solution of acid.

4. The process of making chlorhydrins which comprises acting upon a gaseous mixture containing an olefin with hypochlorous acid while maintaining the supply of hypochlorous acid in the zone of reaction during the reaction.

5. The process of making chlorhydrins which comprises flowing a gaseous mixture containing an olefin through an aqueous solution of a hypochlorite in the presence of a weak acid.

6. The process of making chlorhydrins, which comprises flowing a gaseous mixture containing an olefin through a solution of a hypochlorite and continuously supplying to the zone of reaction a reagent capable of setting free the hypochlorous acid.

7. The process of making chlorhydrins which comprises flowing a gaseous mixture containing an olefin through an aqueous solution of a hypochlorite in the presence of carbon dioxid.

In testimony whereof, I affix my signature.

KARL P. McELROY.